June 2, 1970 W. HACKENBERG ET AL 3,515,812

CALL FORWARDING SYSTEM

Original Filed Sept. 28, 1964 2 Sheets-Sheet 1

CALL FORWARDING SYSTEM

Original Filed Sept. 28, 1964

2 Sheets-Sheet 2

United States Patent Office 3,515,812
Patented June 2, 1970

3,515,812

CALL FORWARDING SYSTEM

Walter Hackenberg, Hirschlanden, and Herbert Siegel, Munchingen, Germany, assignors to International Standard Electric Corporation, New York, N.Y., a corporation of Delaware Continuation of application Ser. No. 399,480, Sept. 28, 1964. This application July 18, 1968, Ser. No. 745,784
Claims priority, application Germany, Oct. 3, 1963, St 21,139
Int. Cl. H04m 3/54
U.S. Cl. 179—18 4 Claims

ABSTRACT OF THE DISCLOSURE

The invention provides special services such as call forwarding which enables a subscriber to set his line so that calls directed thereto are transferred to special service central office equipment. In order to obtain the special services, the subscriber dials a special code and his own directory number from his own telephone. Comparator equipment compares the dial directory number with information obtained from subscriber identification equipment. The subscriber is provided with the desired services only if both numbers compare.

This is a continuation of application Ser. No. 399,480 filed Sept. 28, 1964, now abandoned.

This invention relates to a telephone exchange in which a subscriber can have his line switched into a special service condition.

One of the special service conditions which is of interest is the absentee subscriber condition, but others exist. When a line is in the absentee subscriber condition, and an incoming call for that subscriber occurs, the call is extended to a special operator's position, or to a talking machine from which the caller receives a pre-recorded announcement.

An object of the present invention is to provide a telephone exchange in which a subscriber line can be set into one of the special service conditions in response to signals from that subscriber's own line.

According to the present invention there is provided an automatic telephone exchange, in which when a call is initiated, line identification means determines the identity of the calling line and transmits that identity to first storage means in the register seized for the call, in which the number whose identity is signalled from the subscriber line after the reception thereof of "dial tone" is received at the register and stored therein in a second storage means, in which to set his own line into a special service condition the subscriber sends signals identifying his own number and a code combination appropriate to the special service condition, which code combination is stored in the register in third storage means, in which a comparator compares the contents of said second storage means on reception with the result of said line identification as stored in said first storage means, in which said comparator finds that the contents of said first and said second storage means represent the same number, the caller's number and the special code combination are transferred to common switching means wherein a record is made indicating that that line is in the special service condition to which said code combination relates, and in which any call directed to a subscriber whose line has been set into said special service condition is dealt with in a manner dependent on that special condition.

In the above paragraph and elsewhere in the specification "dial tone" and other references to "dialling" appear in inverted commas because in many modern systems push buttons or other digit sending means is used instead of the conventional dial.

An embodiment of the invention will now be described with reference to the accompanying drawings, which show as much of a telephone exchange as is necessary to understand the invention.

Figure 1:
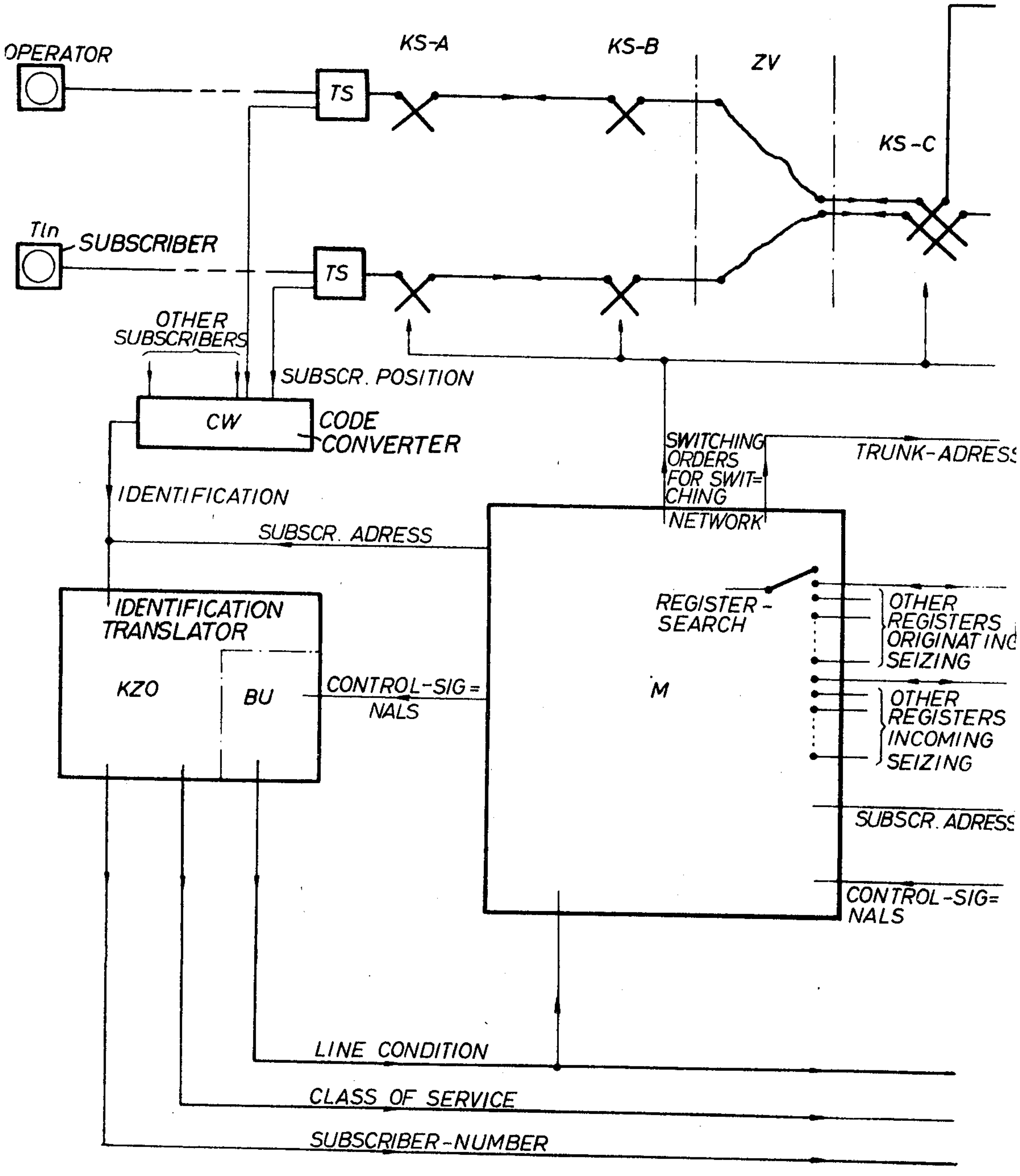
FIG. 1 shows the input and certain control portions of the inventive telephone system including a switching array with an associated marker and translator.
Figures 2, 3:
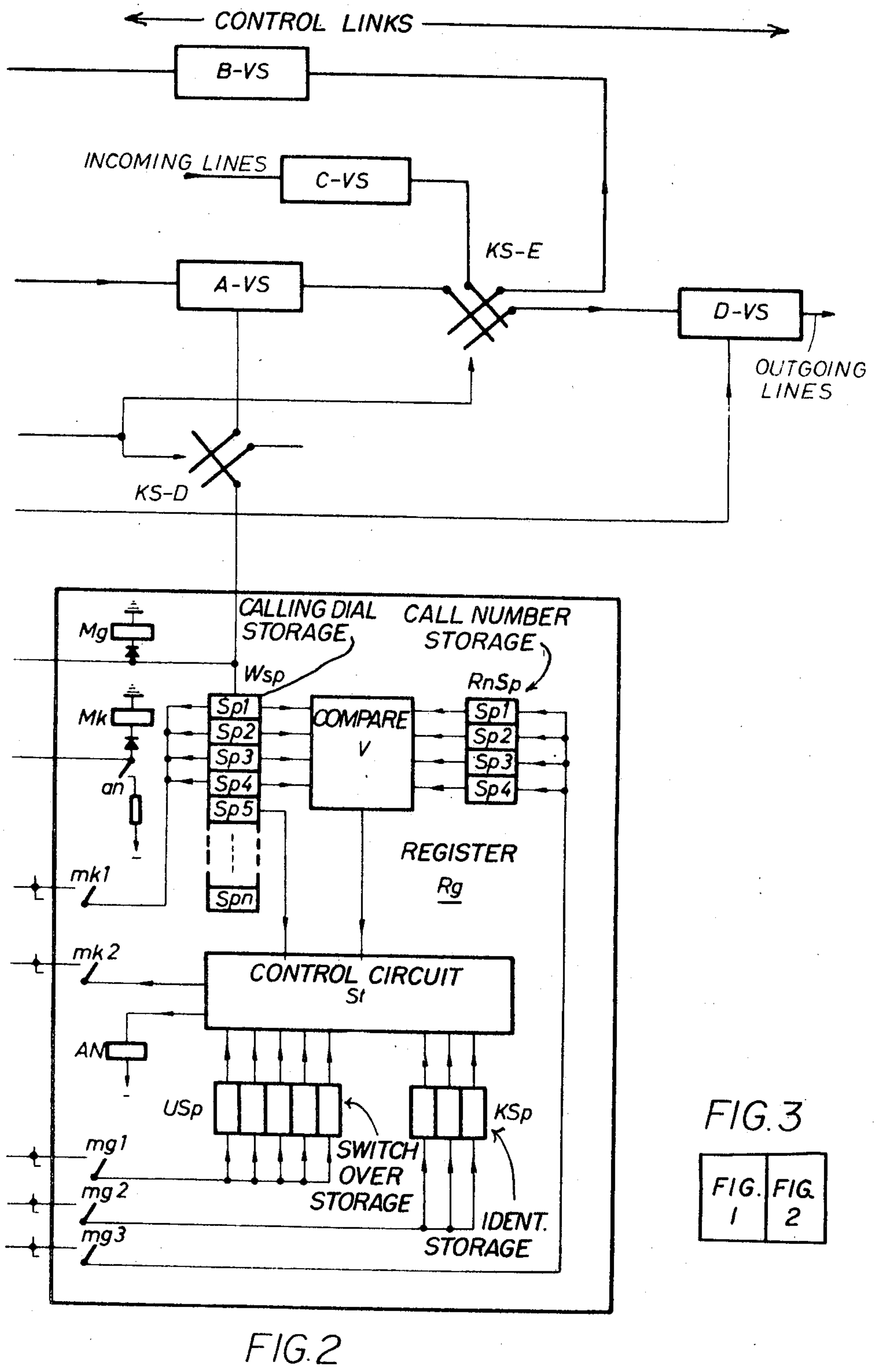
FIG. 2 shows the output and certain control portions of the inventive telephone system including the control links, and the register.
FIG. 3 shows the manner in which FIGS. 1 and 2 may be joined to provide a complete showing of an embodiment of the inventive telephone system.

The exchange to which the drawing relates has a common translator KZO–BU (or two or more such translators if traffic or security needs call for them) which is seized for each call originated by a line connected to the exchange. This translator produces the following items of information relating to the calling line:

(a) The line's number (either its directory number, its equipment number, or both, as required), which is obtained from a line identifier via a code converter, the identifier and code converter being indicated at CW.

(b) The class of line to which the calling subscriber's line belongs.

(c) An indication of any special conditions then pertaining to the calling subscriber's line.

This translator also functions in a similar way in respect of terminating calls, as will be clear later.

The information items mentioned above are transmitted over connections 1, 2, 3 to the register which has been seized for the connection. With the register seized, contacts *mg*1, *mg*2 and *mg*3 of a relay M*g* are all closed. Means( not shown, but well-known) ensures that this information finds its way to the correct register, where it is stored. The identified number enters the calling line store R*n*S*p*, the class of line enters the store KS*p*, and the special condition information enters the special store US*p*.

At this point it will be noted that the special condition information serves, in the case of an outgoing call, to control "dial tone" emission. The term "dial tone" is put in inverted commas because (as mentioned above) in many modern systems, push button or keysenders are used, so that "dial tone" is not a strictly accurate term. However, it is used but in inverted commas as a concession to tradition. Thus two diffeernt "dial tones" can be available, a normal one sent when the caller is not in a special service condition, and a special "dial tone" sent when the line is in a special condition. Thus in general if a line is in a special condition, calls can be originated therefrom, but wll not be terminated thereat if the special condition does not allow of it.

When a subscriber wishes his station to be set to a special condition such as "absentee subscriber," he "dials," in response to the "dial tone," his own number, which is followed by a special code requesting switch over to the desired special condition. The special code acts to actuate the equipment in the marker used to set the special service condition. The number he "dials" is received in storage device W*sp* of the register, and the special code in the storage device formed by storage cells *Sp*5–*Spn*. If a comparator V finds that the "dialled" number as stored in W*sp* is the same as the result of the calling line identification, as stored in R*n*S*p*, it switches a control circuit S*t* to its operated conditions. When this happens the special code in the cells *Sp*5–*Spn* can be responded to effectively.

At this time relay M*k* is operated, having been operated by the marker M, so that the caller's number is sent over *mk*1 to the marker. This sending occurs either serially over a single wire, or parallel fashion over a block of wires each of which is enabled over an MK contact. In addition, a signal indicative of the special service condition to be dealt with is sent over *mk*2 to the marker M. As a result of the reception of this information, the marker passes on the signal indicating the type of special service condition to the translator KZO–BU, which latter thereupon records in itself an indication that the calling line is in that condition. The translator also receives the caller's identity from the marker.

It will be appreciated that the call number comparison used in the present arrangement avoids the possibility that one subscriber can either erroneously or malevolently switch another subscriber into a special service condition. The transmission of the caller's class of line to KS*p* has not been mentioned: this is used in the present case to determine whether the caller is entitled to have his line switched on request to the special condition in question. This determination is performed when S*t* is rendered operable, at which time S*t* checks from the class of line whether this entitlement exists.

Where one caller attempts to set another to a special service condition, that one caller receives busy tone, under control of the comparator output. The absence of the special code in dialing by the authorized subscriber prevents busy signals from being received when the calling is merely attempting to place an outgoing call. The codes sent from a caller to identify the special conditions are single digit or plural digit, depending on how many of them are available, and from these codes switching orders are derived by the translator KZO.

The use of the marker M was mentioned above: this is called by the register as soon as the latter has received the "dialled" information, and it then causes relay MK to operate to allow information transfer from register to marker as already described. The address of the subscriber is sent to the translator as in the case of a terminating call, while the special service code is applied to the switchover portion BU of the translator, which causes an adjustment to be made to the stored information in the translator.

When the adjustment called for by the special service code has been made, the marker M receives a signal from KZO, and this causes release of the translator, marker and register.

In the case of the absentee subscriber code, the subscriber can, by the special code he sends, ensure that after the adjustment called for by that code has been made, any subsequent call incoming to his line is routed to a special operator's position or to a talking machine.

Thus, when a subscriber in the absentee condition is called by another subscriber, the register seizes the marker in the usual way after dialling has been completed, and the marker receives the wanted subscriber's number via the connection(s) controlled by *mk*1. The translator is then appropriated for use by the marker, which would normally result in the marking of the wanted line via the translator KZO, but in the present case the presence of the special marking prevents such marking. Instead a special marking routes the call either to a special operator or to a talking machine, as already mentioned.

The translator can contain its stored data partly in electrical form, which part can be altered by electrical means in response to special service codes, and partly in an electromechanical form. The latter part is the part which is seldom altered, and can consist conveniently of soldered or plugged connections.

Where class of line indications, whereby certain subscribers are assigned the right to set their lines to special service conditions, are liable to frequent change, these indications can be recorded in the electrical manner. However, it is desirable that this facility be limited to a few lines only. Lines to which this facility is assigned have a special class of line indication addition to the usual one.

If the class of line of such a line is to be altered from an operator's position, the subscriber's number is "dialled" in the usual way. However, due to the special class of line indication the register only seizes the marker when the operator "dials" an extra code digit. This prevents the usual comparator operation, and a special signal passes via the marker to the translator in the usual way to effect the necessary adjustment to the stored information. The special digit also ensures that the connection is not made to the "dialled" line. In addition, an acknowledgement signal can be sent to the operator when the adjustment to the stored data has been made.

If the operator at such a special service operator's position wishes to call a subscriber station, he must dial, in addition to the wanted number a further special code digit in response to which the connection is established.

To return to the special service condition, when a subscriber whose line is in that condition wishes to withdraw his line from it, he picks up his handset, and (as mentioned above) receives the special "dial tone." He then "dials" his own number and a special code for withdrawing his line from that condition (this code could be the same code as used to put the line into that condition)—or alternatively the code for a different condition. In either case the response occurs in a manner appropriate to what is "dialed" and in the manner already described.

We claim:

1. In a common control telephone system comprising a plurality of subscriber lines wherein certain of said subscriber lines can be put into special service conditions, means for providing a class of line indication for permitting said certain subscribers to be placed into said special service conditions, line identification translator means for automatically determining the identity of calling lines, a plurality of registers, means responsive to a calling line in the off-hook condition for seizing one of said plurality of registers, means for transmitting information regarding the calling line identity determined in said line identification translator means to first storage means in said seized one of said registers, means for storing information dialed and received through said calling line in second storage means in said seized one of said registers, said second storage means including means for receiving a dialed code combination indicating a special service condition from said calling line at said seized register, comparator means for camparing the contents of said first storage means and said second storage means, and means responsive to said comparator means determining that the contents of said first and second storage means are identical and to said dialed code information for putting said calling subscriber line into said special service condition defined by said dialed code combination.

2. A system according to claim 1 and means wherein said special service condition is a call forwarding condition, control circuit means responsive to said comparator signal determining that said storage contents are identical for providing controls signals, and means responsive to said control signals for providing information to said identification translator means to transmit calls directed to said calling line to a forwarded station.

3. The system according to claim 2 wherein means are provided in said identification translator means for providing class of service and line condition information to said seized one of said registers, means in said register means for giving special dial tone signals responsive to the class of service condition indicated by the dialed code combination received from the calling subscriber and the line condition information.

4. The system according to claim 3 and means responsive to said comparator determining that said contents of said first and second stores are not identical for transmitting a busy signal to said calling subscriber.

References Cited

UNITED STATES PATENTS

| | | |
|---|---|---|
| 2,957,047 | 10/1960 | Wennemer. |
| 3,178,516 | 4/1965 | Bonanno. |

WILLIAM C. COOPER, Primary Examiner